(12) United States Patent
Kindler et al.

(10) Patent No.: US 6,539,141 B1
(45) Date of Patent: Mar. 25, 2003

(54) OPTICAL CROSS-BAR SWITCH

(75) Inventors: David Kindler, Concord, MA (US); Mark Steinback, Newton, MA (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 09/777,972

(22) Filed: Feb. 6, 2001

Related U.S. Application Data

(60) Provisional application No. 60/181,828, filed on Feb. 11, 2000, and provisional application No. 60/181,681, filed on Feb. 11, 2000.

(51) Int. Cl.[7] .................................................. G02B 6/42
(52) U.S. Cl. ............................................. 385/18; 385/19
(58) Field of Search ................................. 385/16–19

(56) References Cited

U.S. PATENT DOCUMENTS 5,016,978 A * 5/1991 Fargette et al. ............. 350/269
5,179,602 A * 1/1993 Norcross, Jr. ................ 385/19
6,256,430 B1 * 7/2001 Jin et al. ...................... 385/18

* cited by examiner

*Primary Examiner*—Akm E. Ullah
*Assistant Examiner*—Jerry T Rahll
(74) *Attorney, Agent, or Firm*—Fish & Richardson P.C.

(57) ABSTRACT

An optical switching element for use in an optical cross-bar array, includes a magnetically responsive curtain that switches between an extended state and a deflected state in response to an applied switching-field. The switching element includes a curtain that moves in response to a magnetic field. The curtain has a fixed edge attached to a substrate and a free edge opposite the fixed edge. A first magnetic-field source magnetically coupled to the curtain generates a first magnetic field that urges the curtain into an extended position in which the curtain intercepts the optical beam. A second magnetic-field source, also magnetically coupled to the curtain, generates a second magnetic field that urges the curtain into a deflected position in which the curtain avoids intercepting the optical beam.

19 Claims, 13 Drawing Sheets

OPTICAL CROSS-BAR SWITCH

RELATED APPLICATIONS

This application claims priority from U.S. Provisional Application Nos. 60/181,828 and 60/181,681, both filed on Feb. 11, 2000, the contents of which are herein incorporated by reference.

This invention relates to optical switches and in particular, to optical cross-bar switches.

BACKGROUND

When two parties communicate over a telephone network, a single physical communication path is set up between their two telephones. Given the vast number of telephones, it is impractical to actually wire each telephone to all other telephones on the telephone network. Instead, the telephones are connected to switches. These switches cooperate to establish and tear down physical paths between telephones on an as-needed basis.

In the early days of telephony, the "switch" was a human operator who sat in front of a switchboard making connections between pairs of receptacles, each receptacle corresponding to a telephone line. Because the telephone signals were electrical signals traveling on copper wire, the operator would connect the two receptacles with a length of copper wire, just like the copper wire on which the telephone signals traveled. Eventually, the operator gave way to automated electromechanical, and later to all electronic switching devices. The connection between the two telephone lines, however, remained electrical. This was reasonable because the telephone signals themselves continued to travel as electrical signals on copper wire.

The end of the last century saw the advent of telephone signals propagating as beams of light on optical fibers rather then as electrical signals on copper wires. Nevertheless, the switches that connected optical fibers together remained electrical. As a result, an optical signal propagating on the optical fiber would have to be converted to an electrical signal, switched, and then converted back to an optical signal.

The need to convert between optical signals and electrical signals is a significant bottleneck in a network having fiber-optic communication paths. A conventional fiberoptic cable can easily carry 15,000 Gbps. The currently practical limit of 40 Gbps is primarily the result of a limit at which currently available optoelectronic devices can switch between optical and electrical signals. It is therefore desirable to replace optoelectronic switches with all-optical switches.

SUMMARY

The invention provides an optical switching element for use in an optical cross-bar array. The optical switching element includes a magnetically responsive curtain that switches between an extended state and a deflected state in response to an applied switching-field.

A switching element that operates in the foregoing manner includes a curtain that moves in response to a magnetic field. The curtain has a fixed edge attached to a substrate and a free edge opposite the fixed edge. A first magnetic-field source magnetically coupled to the curtain generates a first magnetic field that urges the curtain into an extended position in which the curtain intercepts the optical beam. A second magnetic-field source, also magnetically coupled to the curtain, generates a second magnetic field that urges the curtain into a deflected position in which the curtain avoids intercepting the optical beam.

The default state of the curtain can be either the extended state or the deflected state. In the latter case, the first magnetic-field source includes an electromagnet, and the second magnetic-field source includes a permanent magnet. In the former case, the first magnetic-field source includes a permanent magnet, and the second magnetic-field source includes an electromagnet.

The electromagnet can be one or more coils disposed proximate to the free edge of the curtain. In one aspect of the invention, electromagnet includes a first coil proximate to a first face of the curtain. In another aspect of the invention, the electromagnet further includes a second coil proximate to a second face of the curtain. This second coil can be directly opposed to the first coil or diagonally opposed to the first coil.

The curtain itself can include a pre-stressed portion having a tendency to urge the curtain into a position selected from the extended position and the deflected position. The pre-stressed portion can include the entire curtain, a bottom region of the curtain adjacent to the free edge of the curtain, or a corner of the curtain.

In another aspect of the invention, the switching element forms a bistable switch. In one embodiment of such a bistable switch, the switching element includes third and fourth magnetic-field sources magnetically coupled to the curtain. The third magnetic-field source generates a switching field that switches the curtain from the deflected state to the extended state. The fourth magnetic-field source generates another switching field that urges the curtain from the extended state to the deflected state.

In one particular embodiment, the apparatus includes a first member having a first planar surface and a second member having a second planar surface opposed to the first planar surface, the first and second planar surfaces being separated by a gap. A curtain hinged to the first member extends toward the second surface across the gap. This curtain has two positions: an extended position in which the curtain intercepts an optical beam and a deflected position in which the curtain avoids the optical beam. The curtain is held in one of the two positions by a biasing field and switched to the other position by a switching field generated by an electromagnet.

The invention also includes an optical switch of switching elements for coupling an optical beam from a selected input fiber to a selected output fiber. The optical switch includes an array of switching elements arranged into rows and columns on a substrate. Each row corresponds to an output fiber and each column corresponds to an input fiber.

Each of the switching elements includes a curtain that moves in response to a magnetic field. The curtain has a fixed edge attached to the substrate and a free edge opposite the fixed edge. Each switching element also includes first and second magnetic field sources magnetically coupled to the curtain. One of these magnetic-field sources generates a magnetic field that urges the curtain into an extended position in which the curtain intercepts the optical beam. The other magnetic-field source generates a second magnetic field that urges the curtain into a deflected position in which the curtain avoids intercepting the optical beam.

These and other features of the invention will be apparent from the following detailed description and the accompanying figures, in which:

DETAILED DESCRIPTION

Figure 1:
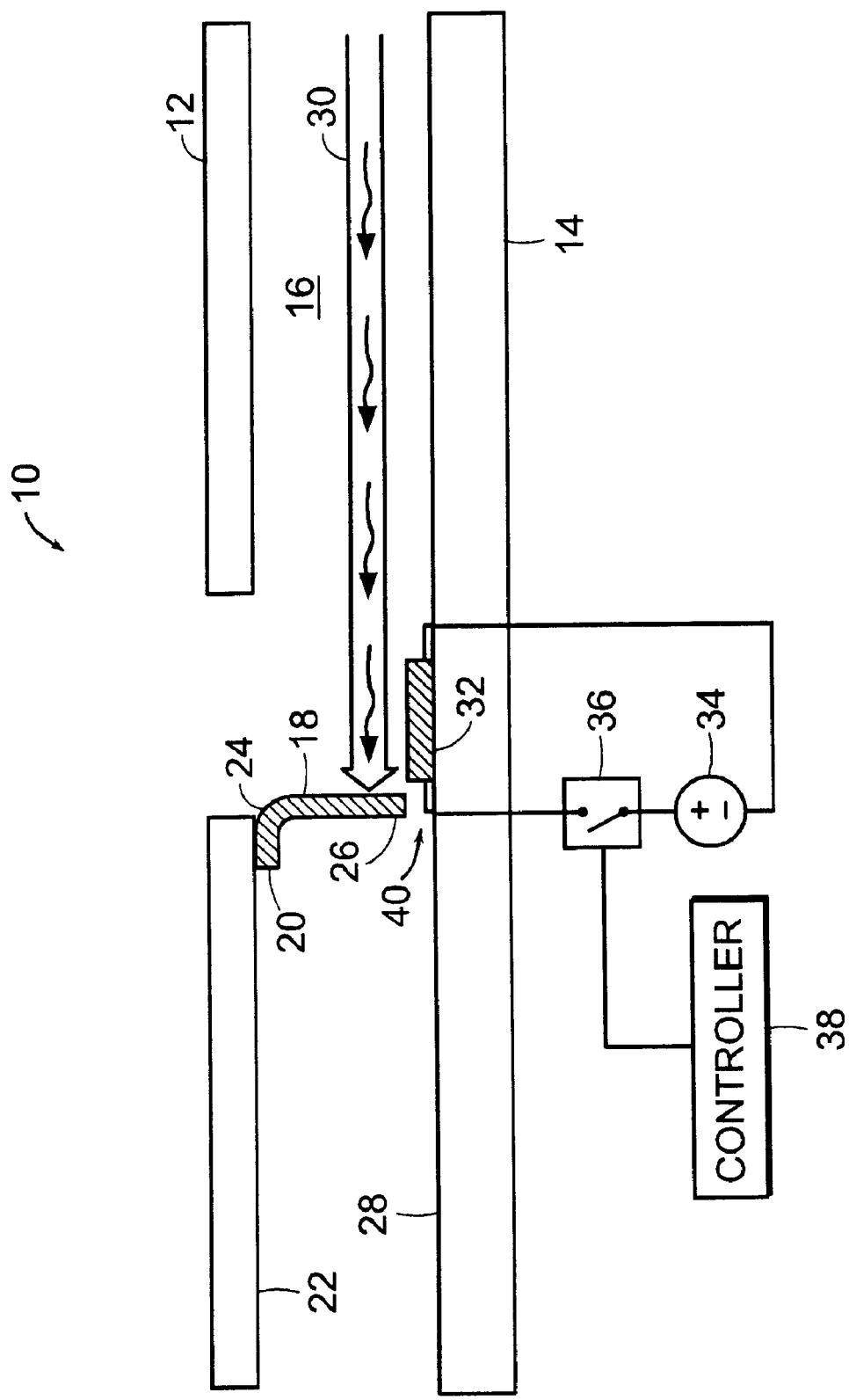
FIGS. 1 and 2 are longitudinal cross-sections of an optical switching element showing the curtain in its extended state and in its deflected state, respectively.

A switching element 10, shown in cross-section in FIG. 1, includes a substrate 12 and a magnetic member 14 separated by an air gap 16. A reflecting curtain 18 extends across a portion of the air gap 16 between the substrate 12 and the magnetic member 14. The reflecting curtain 18 has a fixed edge 20, rotatably coupled to a first planar surface 22 of the substrate 12 by a flexural hinge 24, and a free edge 26 proximate to a second planar surface 28 of the magnetic member 14.

The substrate 12 is typically a material such as silicon. The magnetic member 14 and the curtain 18 are ferromagnetic materials having high coercivity. As a result, the magnetic member 14 and the curtain 18 generate static magnetic fields, referred to as the bias-field and the curtain-field respectively. Suitable materials for the curtain 18 and the magnetic member 14 include those used in the manufacture of magnetic recording heads. A typical material for such use is a mixture of cobalt and chromium.

The magnetic member 14 and the curtain 18 are oriented such that the interaction of the bias-field and the curtain-field attracts the curtain 18 toward the magnetic member 14. This causes the curtain 18 to be in an extended state in which it extends toward the magnetic member 14, as shown in FIG. 1. When placed in the path of a laser beam 30, the extended curtain 18 intercepts the beam 30 and reflects it in a direction that depends on the angle of the curtain 18 relative to the beam 30.

Figure 2:
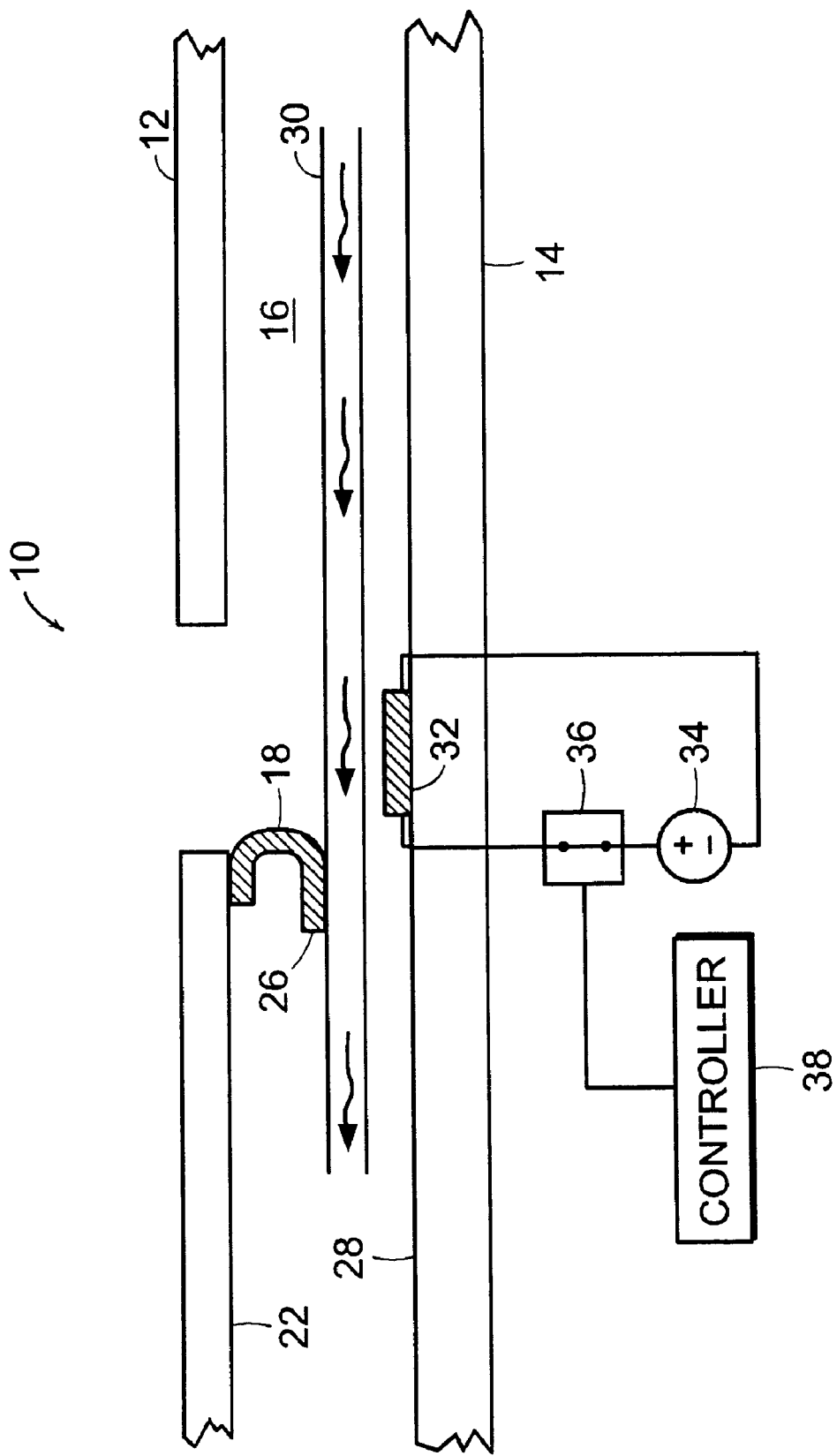

A copper coil 32 is disposed on the second planar surface 28 proximate to the free edge 26 of the curtain 18. The coil 32 is connected to a power source 34 by a switch 36 controlled by the controller 38. A coil current passing through this coil 32 with the correct polarity generates a switching-field that opposes and overcomes the bias-field generated by the magnetic member 14. This causes the curtain 18 to deflect upwards as shown in FIG. 2. When the curtain 18 is in this deflected state, it no longer intercepts the beam 30. Instead, the beam 30 passes under the curtain 18 and continues undisturbed past the switching element 10.

The spacing 40 between the free edge 26 of the extended curtain 18 and the second planar surface 28 is as small as possible so as to maximize magnetic coupling between the curtain-field, the bias-field, and the switching-field. However, the spacing 40 must be large enough to avoid interfering with the movement of the curtain 18. For magnetic field strengths of practical interest, a spacing 40 of approximately 100 microns between the free edge 26 of the curtain 18 and the second planar surface 28 satisfies these constraints. However, the exact spacing 40 will depend on the bias-field strength, the switching-field strength, and the mechanical inertia of the curtain 18.

The dimensions and aspect ratio of the curtain 18 are such that, when extended, the curtain 18 can intercept substantially all the energy in a beam 30 of the type typically used in the optical switch. However, the dimensions must be kept small enough so that can be deflected by the magnetic field generated by the coil 32.

Figure 3:
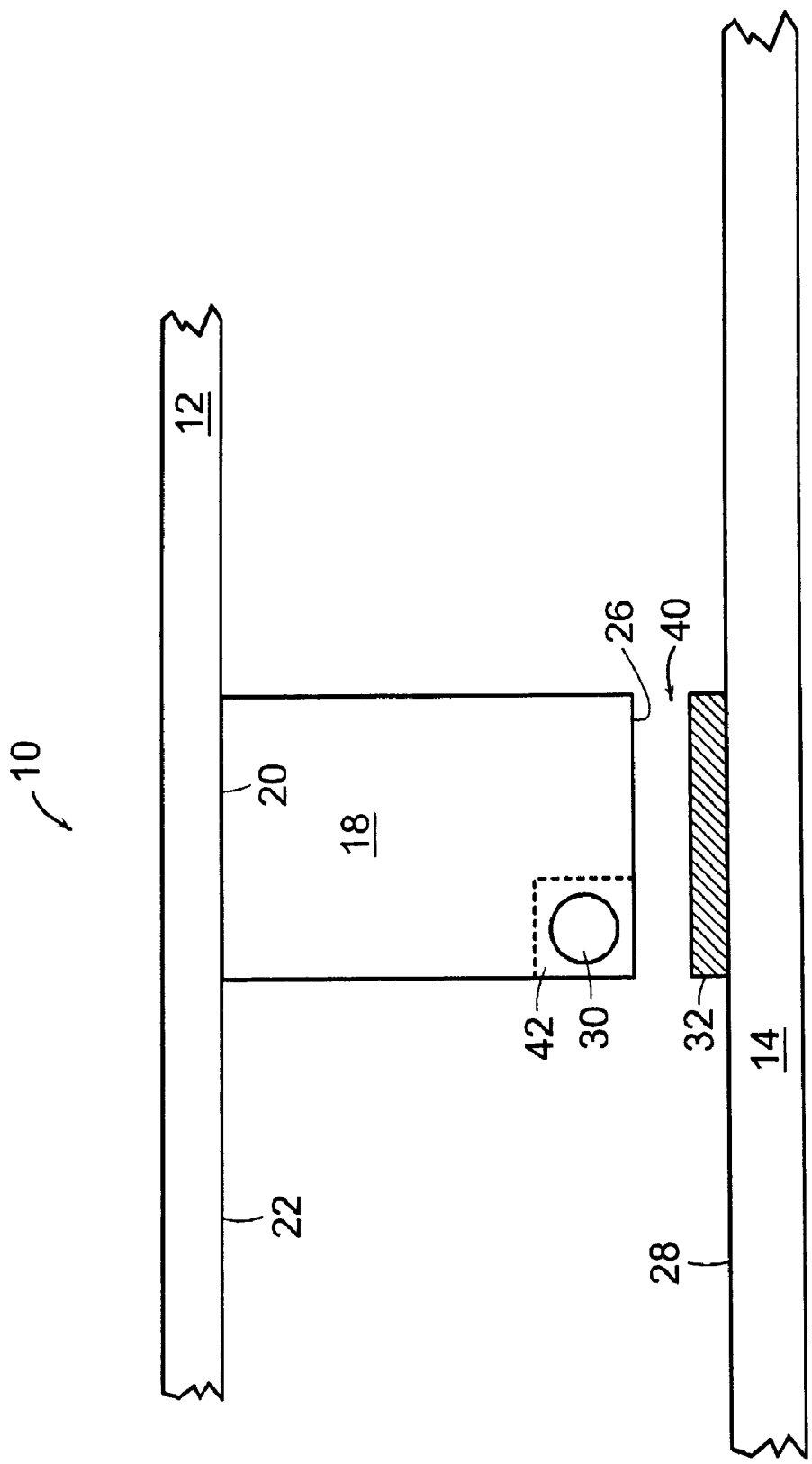
FIG. 3 is a transverse cross-section of the optical switching element with the curtain in its extended state as shown in FIG. 1.

FIG. 3 shows a plan view of the curtain 18 in FIG. 2. The curtain 18 is aligned with the beam 30 so that the bottom of the beam 30 is almost tangent to the free edge 26 of the curtain 18. As a result, a deflection of only a small corner portion 42 of the curtain 18 is sufficient to allow the beam 30 to continue past the switching element 10. This reduces the switching-field strength required to overcome the bias-field, and hence, the coil current required to support the switching-field. In the example shown in FIG. 3, the beam diameter is approximately 100 microns. Hence, the switching-field only needs to be strong enough to deflect a 100 square micron corner portion 42 of the curtain 18.

The corner portion 42 of the curtain 18 can be pre-stressed to have a tendency to curl. The pre-stress is selected to be small enough so that the tendency to curl is readily overcome by the bias-field but large enough to cause the corner portion 42 to curl out of the way of the beam 30 when the switching-field is turned on. As a result, the switching-field strength does not have to be strong enough to deflect the curtain 18. It need only be strong enough to cancel the bias-field to the extent that any residual bias-field is insufficient to overcome the corner portion's tendency to curl. Once this threshold is reached, the pre-stressed corner portion 42 of the curtain 18 can curl away from the beam 30.

Figure 4:
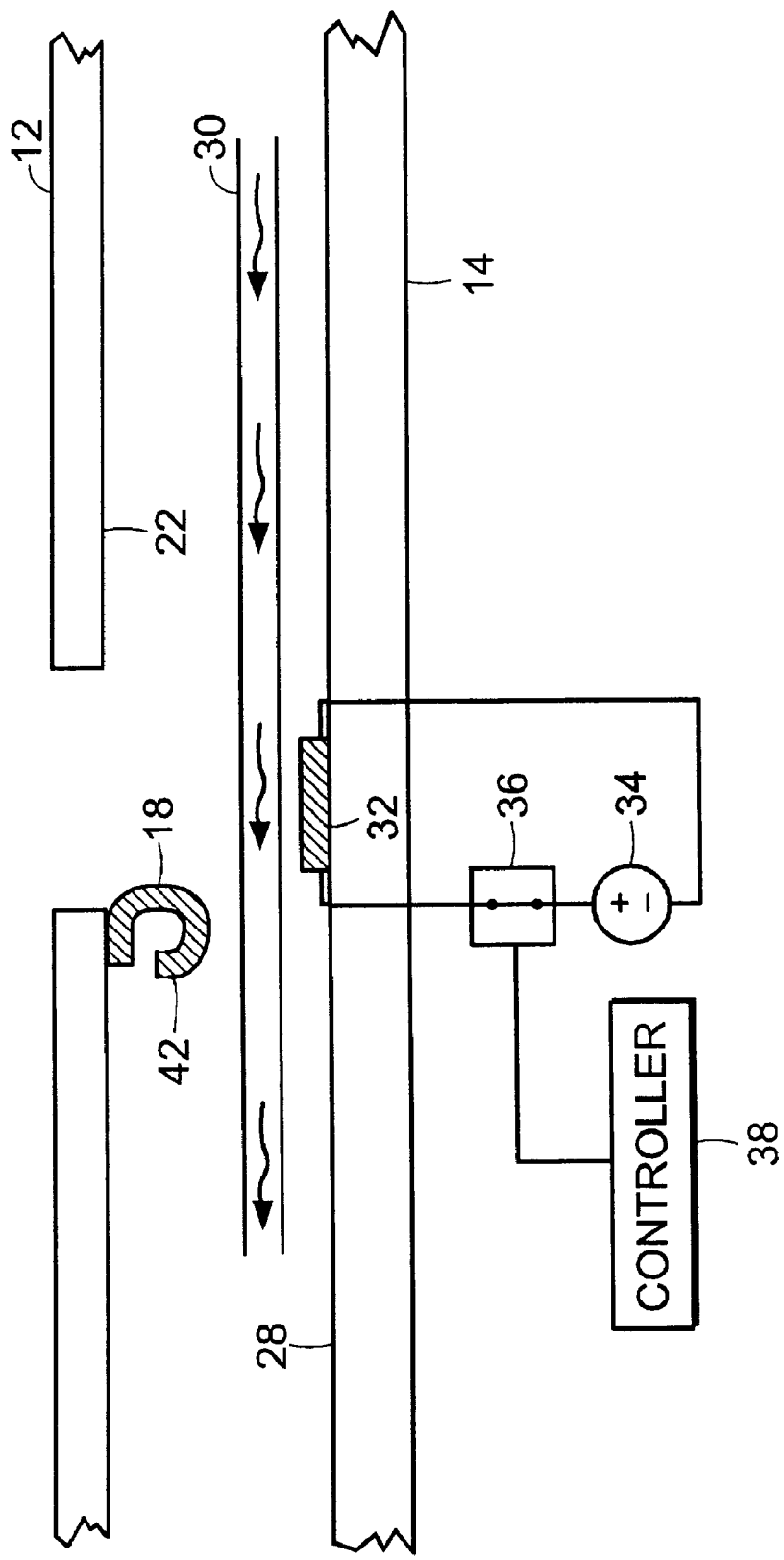
FIG. 4 is a longitudinal cross-section of an optical switching element having a pre-stressed curtain in its deflectedtate.

Alternatively, the entire bottom edge of the curtain 18 can be pre-stressed to have a tendency to curl. When the controller 38 energizes the coil 32, the resulting switching-field cancels the bias field to the extent that the bias-field is no longer sufficient to overcome the free edge's tendency to curl. Once this threshold is reached, the bottom portion of the curtain 18 rolls up into a cylinder, as shown in FIG. 4, thereby providing clearance for the beam 30.

Figure 5:
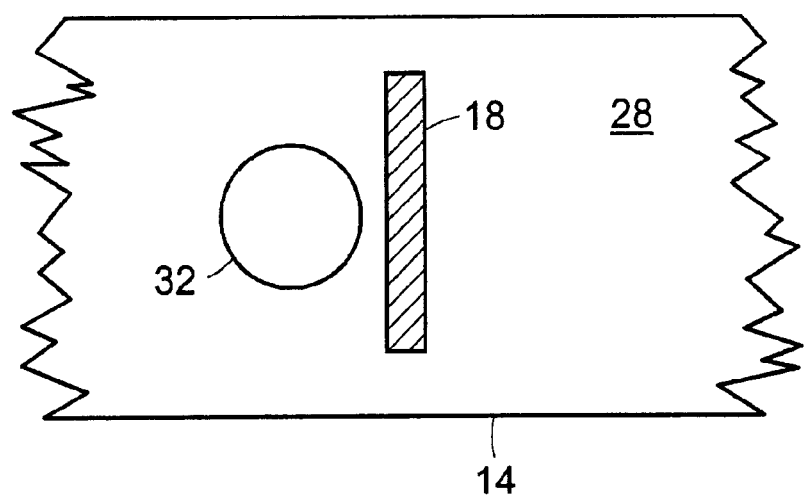
FIGS. 5–7 show different configurations of coils proximate to the free edge of the curtain in FIGS. 1–3.

The planar view of FIG. 5 shows a single coil 32 disposed on the second planar surface 28. A disadvantage to this first coil configuration is that as the curtain 18 deflects in response to the switching-field, it moves into a region of space in which the switching-field is insufficient to overcome the bias-field. If the curtain 18 enters this region before it has deflected enough to provide clearance for the beam 30, the beam 30 will be partially intercepted.

Figure 6:
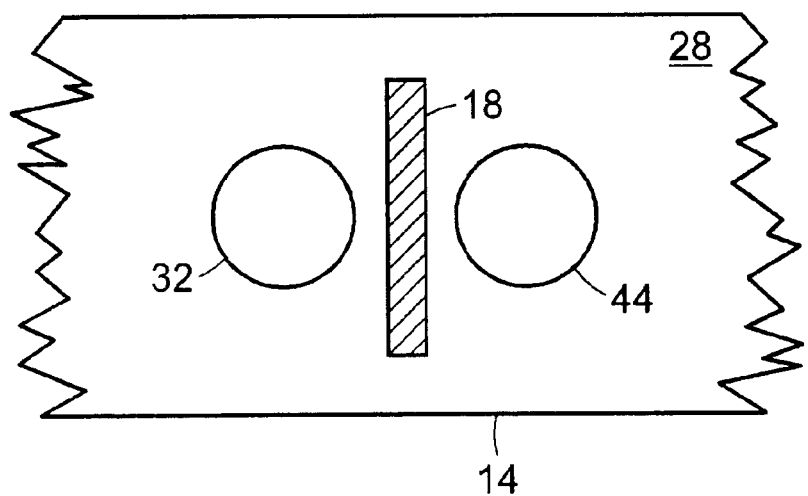

This difficulty is avoided by a second coil configuration, shown in FIG. 6, in which first and second coils 32, 44 disposed on the second planar surface 28 are placed on opposite sides of the curtain 18. In this second coil configuration, as the curtain 18 moves away from the first coil 32, it moves closer to the second coil 44. As a result, the total switching-field seen by the curtain 18 is more spatially uniform that it would be using the coil configuration of FIG. 5.

Figure 7:
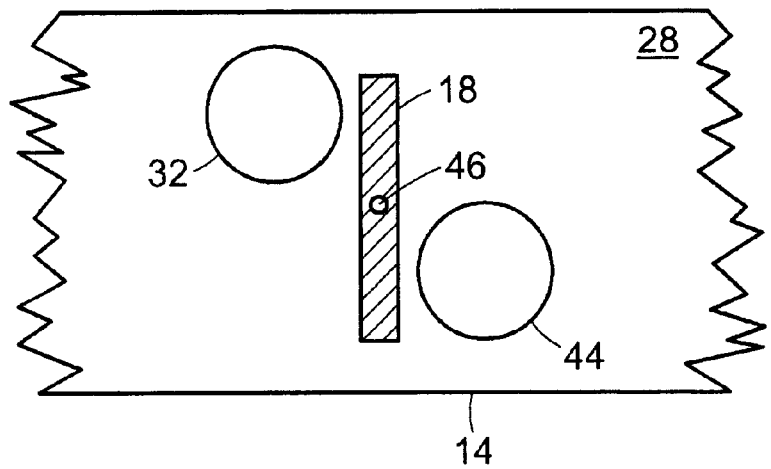
Figure 8:
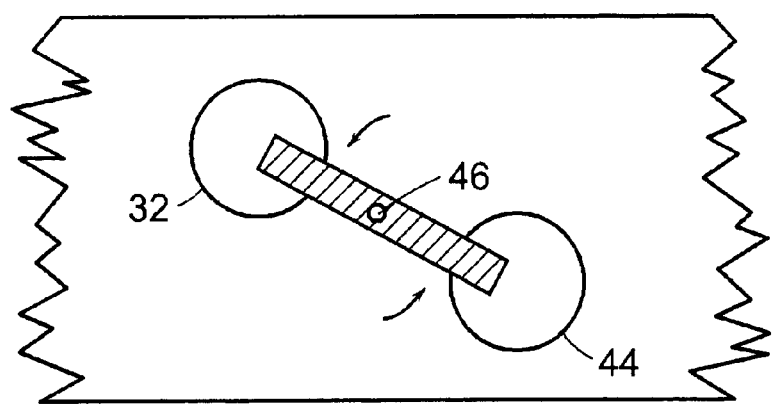
FIG. 8 shows the curtain twisting in response to current in the coils shown in FIG. 7.

In a third coil configuration, shown in FIG. 7, first and second coils 32, 44 disposed on the second planar surface 28 are placed on opposite sides of the curtain 18 but diagonally opposed to each other. In this embodiment, the magnetic force generated by the first and second coils 32, 44 causes the curtain 18 to twist about a central axis 46, as shown in FIG. 8.

Figure 9:
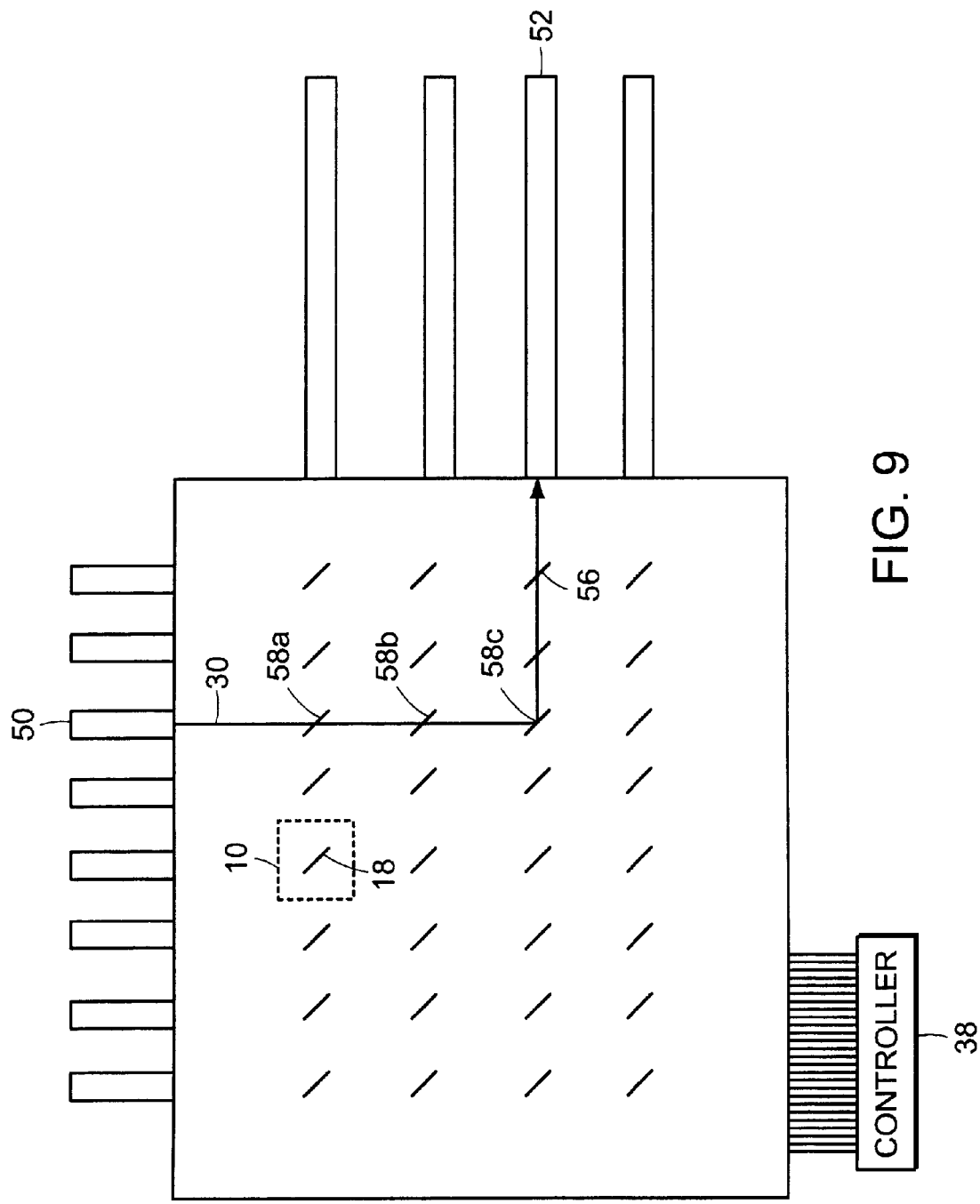
FIG. 9 is a plan view of an optical switch incorporating an array of switching elements of the type shown in FIGS. 1 and 2.

An optical switch 48, shown in plan view in FIG. 9, is intended to direct light entering from an input optical fiber 50 toward an output optical fiber 52 selected from several output optical fibers. The optical switch 48 includes a planar array of switching elements 10 arranged in rows and columns. Each column corresponds to one input optical fiber 50 and each row corresponds to one output optical fiber 52. An optical switch 48 having this architecture is referred to generally as a "cross-bar" switch.

The orientation of the curtains 18 in the optical switch 48 is also shown in FIG. 9. When a curtain 18 associated with a switching element 10 occupying a particular row and column is in its extended state, it intercepts a beam 30 traveling along that column and redirects it to travel along that row toward an output optical fiber 52. Curtains in their extended state are indicated by solid lines 54 in FIG. 1. When a curtain 18 associated with a switching element 10 occupying a particular row and column is in its deflected state, the beam 30 travels along that column undisturbed. Curtains in their deflected state are indicated by dashed lines 56 in FIG. 1. By selectively switching curtains 18 between their extended state and their deflected state, the controller 38, which is in communication with each switching element 10 in the optical switch 48, can cause light injected by an input optical fiber 50 into a column of the optical switch 48 to be directed to any one of the output optical fibers 52.

Figure 10:
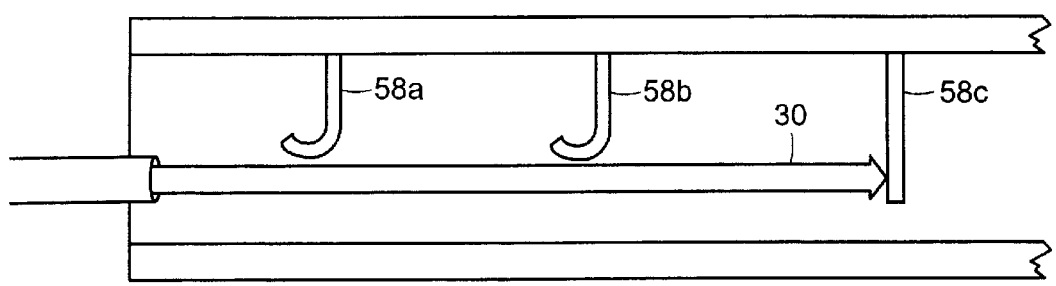
FIG. 10 is a longitudinal cross-section along one column of the optical switch of FIG. 9.

FIG. 10 shows a cross section along the column associated with the input fiber 50 of the optical switch 48 shown in plan view in FIG. 9. In the configuration shown, the controller 38 has set the curtains 58a–c to direct light from the input fiber 50 to the output fiber 52. The controller 38 has set the first two curtains 58a–b in the column between the input fiber 50 and the row that leads to the output fiber 52 to be in their deflected state. The third curtain 58c in that column, which is also on the row leading to the output fiber 52, is set to be in its extended state. As a result, the beam 30 emerging from the input fiber 50 travels freely along the column until it reaches the third curtain 58c, at which point the third curtain 58c redirects it to the row occupied by the targeted output fiber 52.

In the switching element 10 shown in FIGS. 1 and 2, the stable state of the curtain 18 is its extended state. The curtain 18 is maintained in its deflected state, shown in FIG. 2, only when current flows through the coil 32. Once current to the coil 32 is shut-off, the curtain 18 reverts to its extended state, shown in FIG. 1. As a result, a malfunction that prevents adequate current from reaching the coil 32 can disable an entire row and column. To avoid this result, it is desirable to reverse the configuration of the magnetic fields so that the stable state of the curtain 18 is its deflected state. In this configuration, the interaction of the bias-field and the curtain-field deflects the curtain 18 as shown in FIG. 2 and the switching-field overcomes the bias-field to attract the curtain 18 as shown in FIG. 1.

Figure 11:
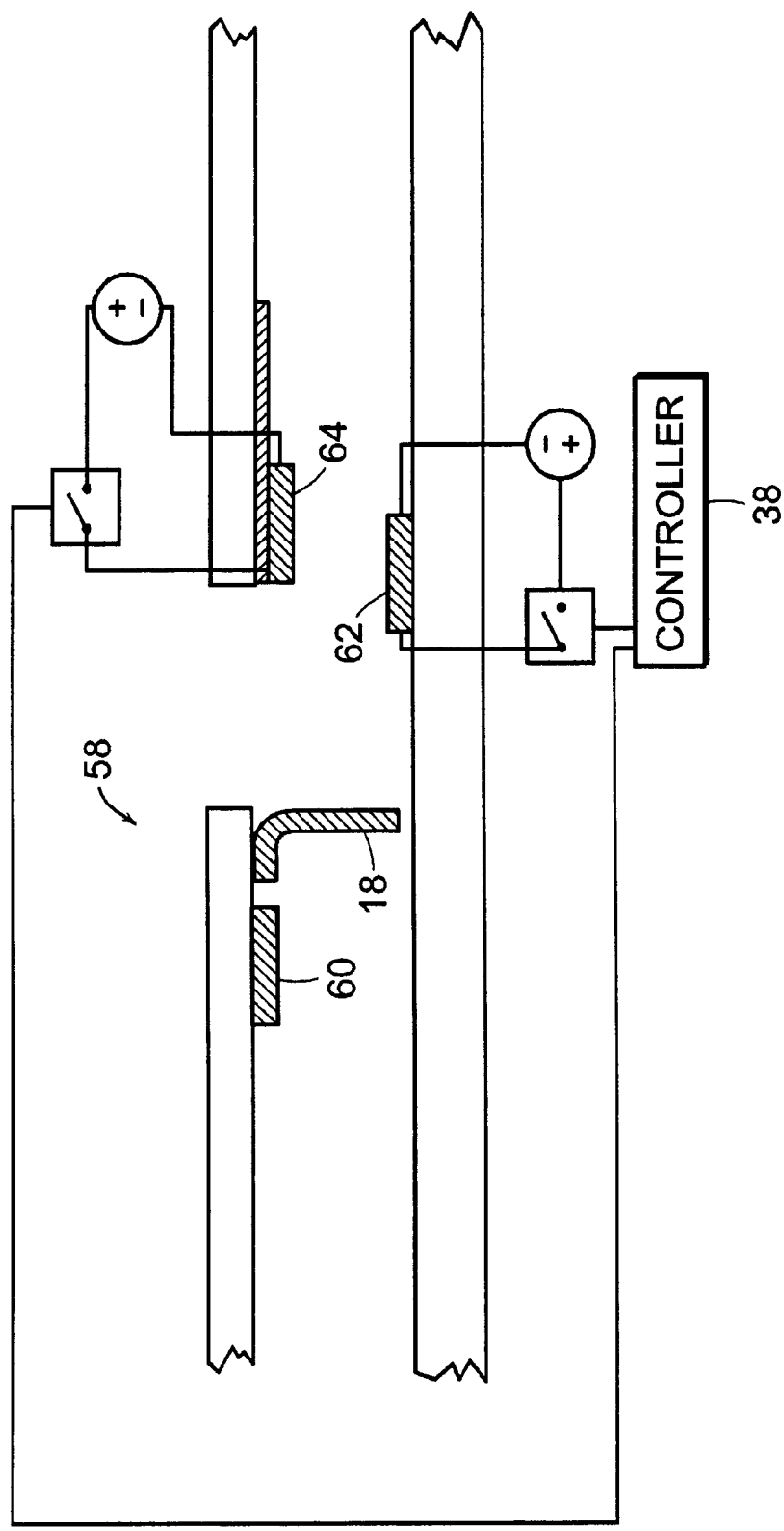
FIG. 11 is a cross-section of a bi-stable version of an optical switching element.

An alternative embodiment, shown in FIG. 11, includes a bi-stable curtain 18. In a switching element having a bi-stable curtain 18, the default state of the curtain is whichever state, extended or deflected, it was most recently switched into. In a switching element 58 having a bi-stable curtain 18, a ferromagnetic coating 60 is deposited on the first planar surface 22. As a result, there are two bias-fields: a first bias-field generated by the magnetic member 14; and a second bias-field generated by the ferromagnetic coating 60. A first coil 62 is disposed on the magnetic member 14 and a second coil 64 is disposed on the ferromagnetic coating 60. The first coil 62 and the second coil 64 are energized by a controller 38 that controls first and second switches 62, 64.

To transition the bi-stable curtain 18 from its extended state to its deflected state, a current is passed through the first coil 62. This results in a first switching-field that deflects the curtain 18 upward toward the ferromagnetic coating 60. As the curtain 18 deflects upward, a portion of it moves into a region in which the second bias-field is strong enough to hold the curtain 18 in its deflected state. Once this occurs, the curtain 18 remains in the deflected state even with the coil current in the first coil 62 turned off.

Conversely, to transition the bi-stable curtain 18 from its deflected state to its extended state, a current is passed through the second coil 64. This results in a second switching-field that deflects the curtain 18 downward toward the magnetic member 14. As the curtain 18 deflects downward, a portion of it moves into a region in which the first bias-field is strong enough to hold the curtain 18 in its extended state. Once this occurs, the curtain 18 remains in the extended state even with the coil current in the second coil 64 turned off.

The layers of ferromagnetic materials and the coils are typically fabricated by thin-film deposition techniques. Such techniques include physical deposition techniques, such as sputtering, evaporation, CVD, and chemical deposition techniques, such as plating. Between the various steps, any organic contaminants are removed by exposing the structure to an oxygen plasma, a process referred to in the art as "descumming." The masks that allow sputtered material to contact selected portions of the structure are deposited on removed by lithographic techniques. The use of thin-film deposition techniques, combined with lithography, enables the fabrication of well-aligned arrays of small, virtually identical switching elements, as illustrated, by example, in the following procedure.

Figure 12:
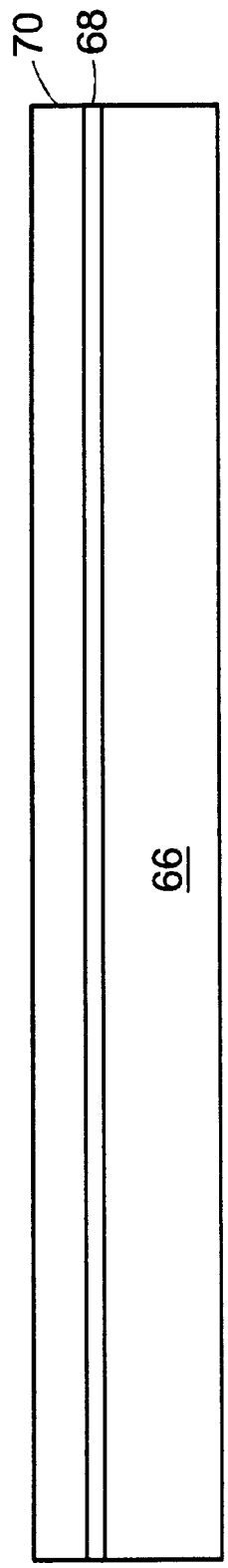
FIGS. 12–19 show different stages in the fabrication of the curtain of FIG. 1.

The curtain 18 of the switching element 10 is fabricated on a silicon substrate 66 having a face on which a stop layer 68 of silicon dioxide has been deposited, as shown in FIG. 12. The stop layer 68 is intended to stop deep-reactive-ion-etching later in the fabrication process. A thickness of approximately 3000 Angstroms has been found to be suitable for this purpose. Substrates as described above are commercially available from a variety of manufacturers.

The first step in fabrication of the switching element 10 is the formation of a release layer 70 on top the stop layer 68, as shown in FIG. 12. This is done by sputtering a 7000 Angstrom thick layer of molybdenum onto the stop layer 68. The purpose of the release layer 70 is to act as a temporary scaffolding to support the curtain 18 during fabrication. The release layer 70 will be removed near the end of the fabrication process, leaving behind a cavity over which the curtain 18 is cantilevered.

Figure 13:
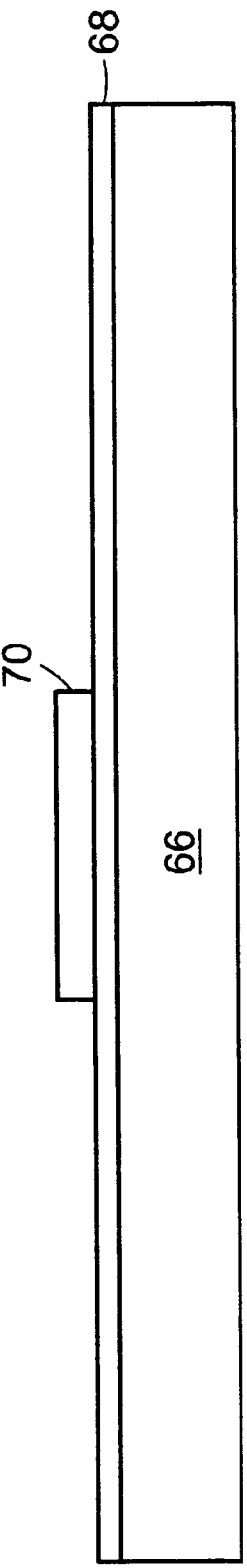

The next step is thus to remove those portions of the release layer 70 that will not be located under the region bounded by the curtain 18. This is performed by coating the release layer 70 with a photoresistive layer and masking those portions of the release layer 70 that will underlie the region bounded by the curtain 18. The exposed portion of the release layer 70 is then wet-etched using 15% hydrogen peroxide at room temperature. After wet-etching and removal of the mask, the remaining release layer 70 is as shown in FIG. 13.

Figure 14:
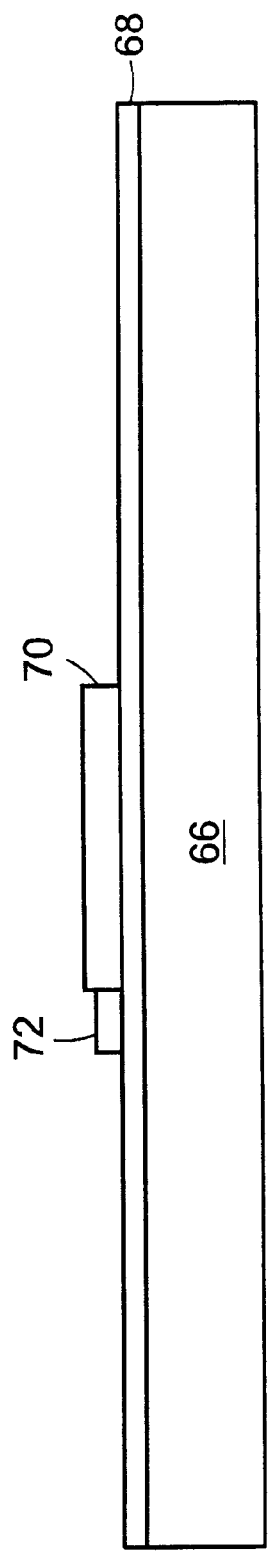

The next step in the fabrication of the switching element 10 is to mask the release layer 70 and the stop layer 68 and to sputter an adhesion layer 72 that forms an attachment point for the fixed edge 20 of the curtain 18. This adhesion layer 72 consists of a 200 Angstrom chromium layer. This results in the stepped adhesion layer 72 shown in FIG. 14.

Figure 15:
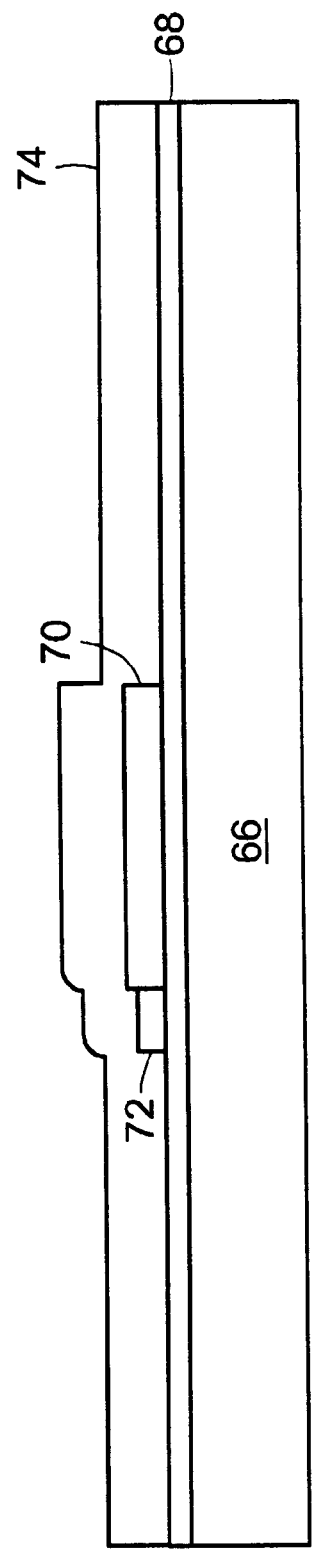

Following the formation of the adhesion layer 72, the next step is the deposition of a ferromagnetic layer 74, shown in FIG. 15, that will ultimately become the curtain 18. The ferromagnetic layer 74 is formed by sputtering a 1000 Angstrom thick layer of ferromagnetic material onto the structures already existing on the substrate 66.

Figure 16:
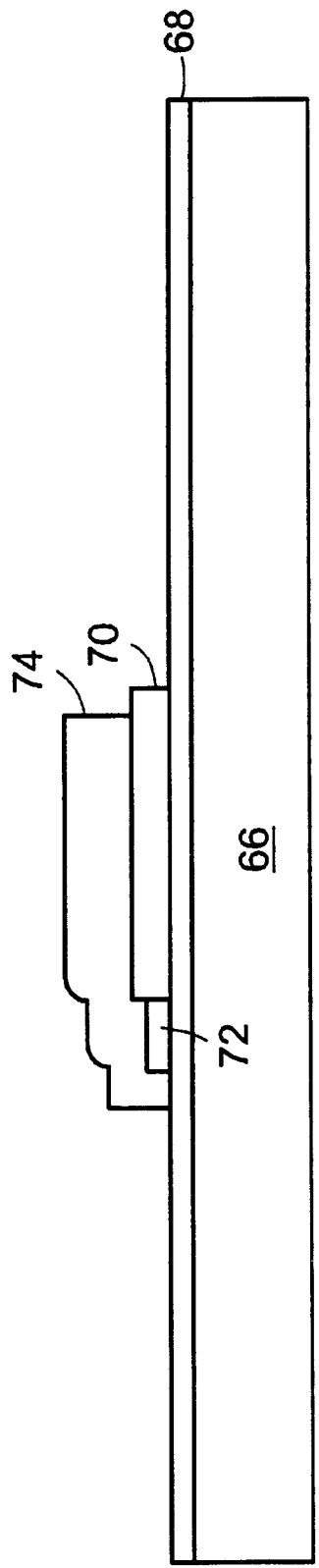

The next step in the fabrication process is to remove those portions of the ferromagnetic-layer 114 that are not needed to form the curtain 18. This is done by masking those portions of the ferromagnetic-layer 114 that are to form the curtain 18, and etching them away with a suitable etchant. The resulting structure is shown in FIG. 16.

With all the structures now complete, the remaining task is to remove the release layer 70 that temporarily supported the precursor of the curtain 18 during the fabrication steps. This is done by performing deep-reactive-ion-etching (DRIE) the back surface of the substrate 66. The region etched in this process extends slightly beyond three of the four edges of the curtain 18. This etching process thus leaves three edges of the curtain 18 free and the fixed edge 20 of the curtain 18 attached to the substrate 66.

Figure 17:
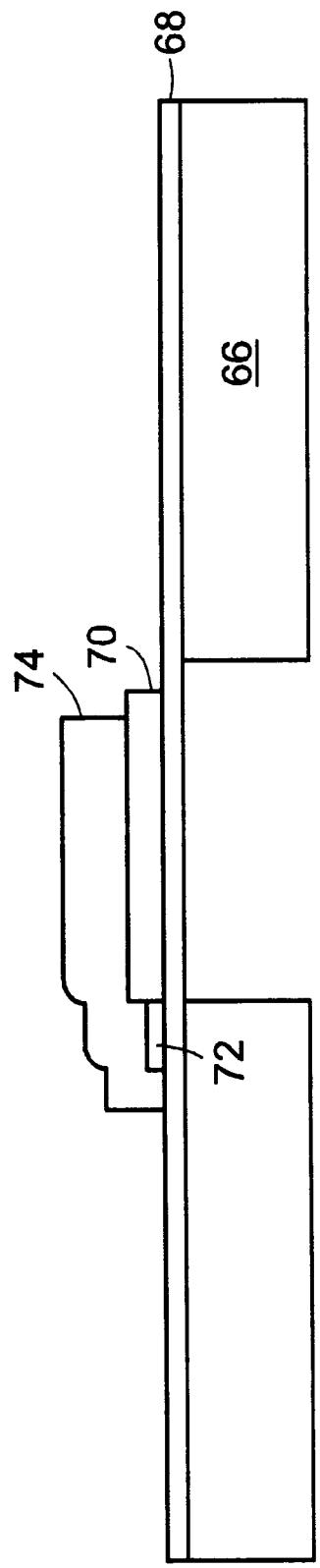
Figure 18:
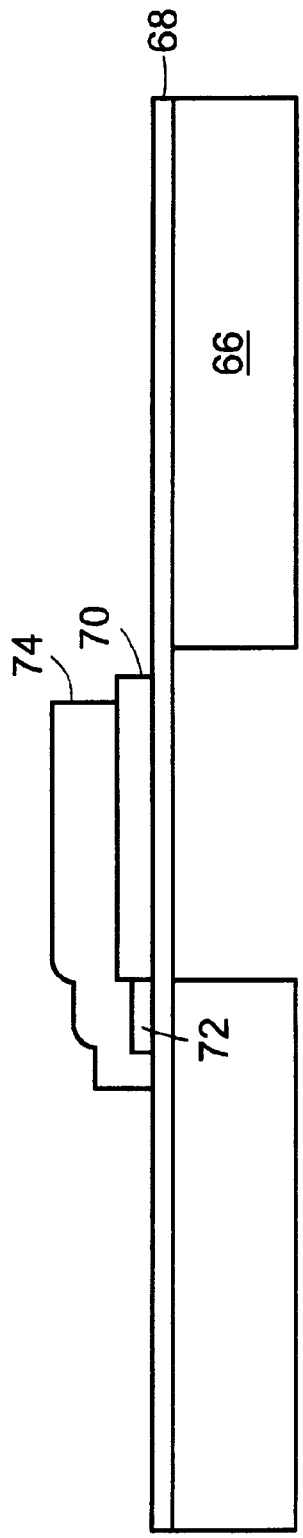
Figure 19:
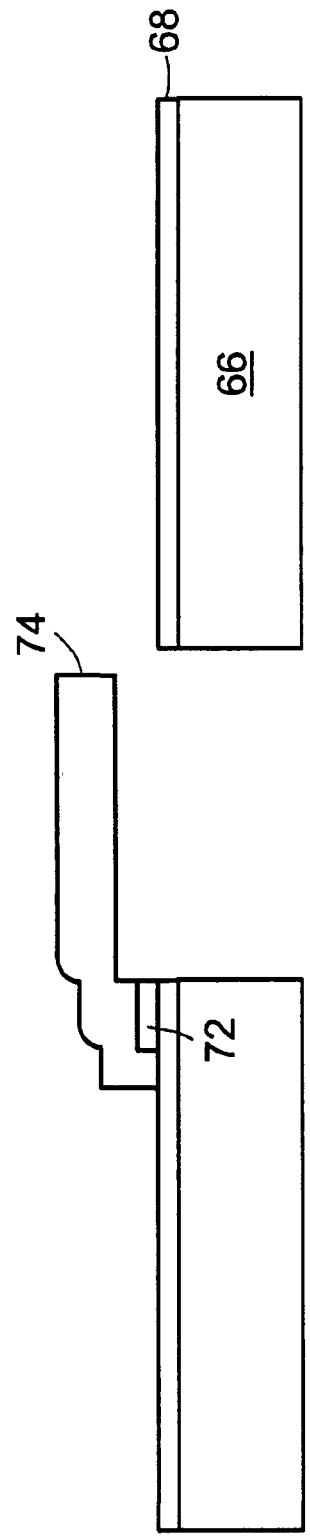

The DRIE etching process proceeds until the stop layer 68 is reached, resulting in the structure shown in FIG. 17. The stop layer 68 is then removed by ion-milling, leaving the release layer 70 exposed, as shown in FIG. 18. Finally, the release layer 70 is removed by exposure to hydrogen peroxide. This leaves the curtain 18 is free to move, as shown in FIG. 19. The curtain 18 is then exposed to a magnetic field having a polarity selected to lift the curtain 18 into position.

Having described the invention, and a preferred embodiment thereof, what we claim as new and secured by Letters Patent is:

1. An apparatus for switching the direction of an optical beam, said apparatus comprising:
    a substrate;
    a curtain that moves in response to a magnetic field, said curtain having a fixed edge attached to said substrate and a free edge opposite said fixed edge;
    a first magnetic-field source magnetically coupled to said curtain, said first magnetic-field source generating a first magnetic field urging said curtain into an extended position in which said curtain intercepts said optical beam; and
    a second magnetic-field source magnetically coupled to said curtain, said second magnetic-field source generating a second magnetic field urging said curtain into a deflected position in which said curtain avoids intercepting said optical beam,
    at least one of said first and second magnetic-field sources being a permanent magnet.

2. The apparatus of claim 1, wherein said second magnetic field source comprises a first coil proximate to a first face of said curtain.

3. The apparatus of claim 2, said second magnetic field source further comprises a second coil proximate to a second face of said curtain.

4. The apparatus of claim 3, wherein said second coil is directly opposed to said first coil.

5. The apparatus of claim 3, wherein said second coil is diagonally opposed to said first coil.

6. The apparatus of claim 1, further comprising:
    a third magnetic-field source magnetically coupled to said curtain, said third magnetic-field source generating a first switching field that urges said curtain from said deflected state to said extended state; and
    a fourth magnetic-field source magnetically coupled to said curtain, said fourth magnetic-field source generating a second switching field that urges said curtain from said extended state to said deflected state.

7. The apparatus of claim 1, further comprising a hinge pivotably coupling said fixed edge of said curtain to said substrate.

8. The apparatus of claim 7, wherein said hinge comprises a flexural hinge.

9. The apparatus of claim 1, wherein said curtain includes a pre-stressed portion having a tendency to urge said curtain into a position selected from said extended position and said deflected position.

10. The apparatus of claim 9, wherein said pre-stressed portion is bounded by said free edge of said curtain.

11. The apparatus of claim 9, wherein said pre-stressed portion comprises a corner of said curtain.

12. The apparatus of claim 1, further comprising a third magnetic-field source magnetically coupled to said curtain, said third magnetic-field source generating a switching field that switches said curtain between a deflected state and an extended state.

13. The apparatus of claim 12, wherein said third magnetic-field source comprises an electromagnet.

14. An apparatus for switching a direction of an optical beam, said apparatus comprising:
    a substrate;
    a curtain that moves in response to a magnetic field, said curtain having a fixed edge attached to said substrate and a free edge opposite said fixed edge;
    a first permanent magnet magretically coupled to said curtain, said first permanent magnet generating a first magnetic field urging said curtain into an extended position in which said curtain intercepts said optical beam;
    a second permanent magnet magnetically coupled to said curtain, said second permanent magnet generating a second magnetic field urging said curtain into a deflected position in which said curtain avoids intercepting said optical beam; and
    an electromagnet magnetically coupled to said curtain, said electromagnet generating a switching field that switches said curtain between a deflected state and an extended state.

15. An apparatus for switching a direction of an optical beam, said apparatus comprising:
    a substrate;
    a curtain that moves in response to a magnetic field, said curtain having a fixed edge attached to said substrate, a free edge opposite said fixed edge, and a pre-stressed portion having a tendency to urge said curtain into a position selected from an extended position in which said curtain intercepts said optical beam and a deflected position in which said curtain avoids intercepting said optical beam;
    a first magnetic-field source magnetically coupled to said curtain, said first magnetic-field source generating a first magnetic field urging said curtain into said extended position; and
    a second magnetic-field source magnetically coupled to said curtain, said second magnetic-field source generating a second magnetic field urging said curtain into said deflected position.

16. The apparatus of claim 15, wherein said pre-stressed portion is bounded by said free edge of said curtain.

17. The apparatus of claim 15, wherein said pre-stressed portion comprises a corner of said curtain.

18. An apparatus for coupling an optical beam from a selected input fiber to a selected output fiber, said apparatus comprising:

a substrate;

an array of switching elements arranged into rows and columns on said substrate, with each row corresponding to an output fiber and each column corresponding to an input fiber, each of said switching elements including
- a curtain that moves in response to a magnetic field, said curtain having a fixed edge attached to said substrate and a free edge opposite said fixed edge;
- a first magnetic-field source magnetically coupled to said curtain, said first magnetic-field source generating a first magnetic field urging said curtain into an extended position in which said curtain intercepts said optical beam; and
- a second magnetic-field source magnetically coupled to said curtain, said second magnetic-field source generating a second magnetic field urging said curtain into a deflected position in which said curtain avoids intercepting said optical beam;
- at least one of said first and second magnetic field sources being a permanent magnet.

19. The apparatus of claim 18, further comprising a controller in communication with a magnetic field source selected from said first magnetic field source and said second magnetic field source.

* * * * *

UNITED STATES PATENT AND TRADEMARK OFFICE
CERTIFICATE OF CORRECTION

PATENT NO.     : 6,539,141 B1                                              Page 1 of 1
DATED          : March 25, 2003
INVENTOR(S)    : Mark Steinback and David Kindler It is certified that error appears in the above-identified patent and that said Letters Patent is hereby corrected as shown below:

<u>Title page,</u>
Item [*] Notice, replace "0 days" with -- 32 days --

<u>Column 1,</u>
Lines 9-10, this paragraph should be moved above "RELATED APPLICATIONS" in column 1, line 3

<u>Column 4,</u>
Line 10, between "that" and "can" insert -- the curtain 18, or at least that portion of the curtain 18 on which the beam 30 is incident, --

<u>Column 7,</u>
Line 26, after "18" delete "is"
Line 54, after "claim 2," insert -- wherein --

<u>Column 8,</u>
Line 28, replace "magretically" with -- magnetically --

Signed and Sealed this

Second Day of December, 2003

JAMES E. ROGAN
*Director of the United States Patent and Trademark Office*